United States Patent
Lee

[11] Patent Number: 5,802,769
[45] Date of Patent: Sep. 8, 1998

[54] DOOR GLASS LIFTING APPARATUS FOR A VEHICLE

[75] Inventor: Kwangho Lee, Kyungsangnam-do, Rep. of Korea

[73] Assignee: Hyundai Motor Corporation, Seoul, Rep. of Korea

[21] Appl. No.: 689,261

[22] Filed: Aug. 6, 1996

[30] Foreign Application Priority Data

Sep. 5, 1995 [KR] Rep. of Korea .................. 1995-24082

[51] Int. Cl.⁶ ........................................................ B60J 1/16
[52] U.S. Cl. ............................................... 49/374; 49/375
[58] Field of Search ............................. 49/374, 375, 425, 49/348, 349, 350, 351, 352, 227, 502

[56] References Cited

U.S. PATENT DOCUMENTS

| | | |
|---|---|---|
| 2,214,328 | 9/1940 | Haberstump ............................. 49/375 |
| 2,283,002 | 5/1942 | FLoraday ................................. 49/375 |
| 2,822,215 | 2/1958 | Blanton et al. .......................... 49/425 |
| 3,385,000 | 5/1968 | Sturtevant et al. ................... 49/374 X |
| 4,069,617 | 1/1978 | Koike ................................... 49/374 X |
| 4,418,498 | 12/1983 | Wanlass et al. ........................ 49/425 |
| 4,530,186 | 7/1985 | Guillon ............................... 49/374 X |
| 4,680,892 | 7/1987 | Ugawa et al. ........................ 49/425 X |

*Primary Examiner*—Kenneth J. Dorner
*Assistant Examiner*—Curtis Cohen
*Attorney, Agent, or Firm*—Finnegan, Henderson, Farabow, Garrett, & Dunner, L.L.P.

[57] ABSTRACT

A door glass lifting assembly comprising guide grooves formed on a door glass run and a division channel for guiding and supporting a door glass lifted by force applied by a door regulator with power supplied from a motor, which includes roller mounted on two sides of the door glass and inserted into the guide grooves to separating two sides of the door glass from the guide grooves, and thereby reducing the mutual lifting friction between the two sides of the door glass and the guide grooves.

4 Claims, 2 Drawing Sheets

DOOR GLASS LIFTING APPARATUS FOR A VEHICLE

BACKGROUND

The present invention relates to a door glass lifting apparatus for a vehicle, and more particularly, to a door glass lifting apparatus which allows a door glass to be easily lifted by reducing friction of the door glass lifted by a door regulator.

The door glass lifting apparatus for a vehicle opens and closes the door glass manually or automatically according to an operating method of the regulator which applies lifting force to the door glass.

Such a door glass lifting apparatus lifts the door glass by operating force of a regulator handle or driving force of a power window motor.

The lifted door glass 51, as shown in FIG. 4, is inserted into grooves 57 formed on a door glass run 53 mounted on a door frame(not shown) and a division channel 55 coupled with the door glass run 53.

The door glass 51 whose two sides are inserted into the grooves 57 is lifted by being guided by the grooves 57.

However, such a door glass lifting apparatus makes noise because of the friction between the door glass and the guide grooves and reduces the life of the door regulator since the door glass is lifted under the condition that the two sides of the door glass are in direct contact with the grooves of the door glass run and the division channel.

Accordingly, an object of the present invention is to provide a door glass guide roller assembly for vehicle which makes the door glass smoothly lifted and extends the life of the door regulator by reducing the lifting friction of the door glass inserted into the guide grooves.

SUMMARY

To achieve the above object, a door glass lifting apparatus for vehicle according to the present invention comprises:

guide grooves formed on a door glass run and a division channel for guiding and supporting a door glass lifted by the force applied by a door regulator with power supplied from a power generating means; and friction reducing means mounted on two sides of the door glass and inserted into the guide grooves to separate the two sides of the door glass from the guide grooves, and thereby reducing the mutual lifting friction between the two sides of the door glass and the guide grooves.

The friction reducing means comprises:

fixing axes mounted on two sides of the door glass;

supporting members mounted on two ends of the fixing axes; and rolling members mounted on the supporting members by hinges and rolling along the guide grooves formed on the door glass run and the division channel.

The friction reducing means is characterized by being provided in plural on upper and lower parts of the two sides of the door glass.

As described, the door glass lifting apparatus for vehicle according to the present invention makes the lifting of the door glass easy by reducing the lifting friction of the guide grooves formed on the door glass run and the division channel and the door glass by mounting the friction reducing means on the two ends of the door glass.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a perspective view of a door glass guide roller assembly showing a plural arrangement of friction reducing means in the upper and lower part of a door glass.

DESCRIPTION

Preferred embodiments of the present invention will now be described in detail with reference to the accompanying drawings.

Figure 1:
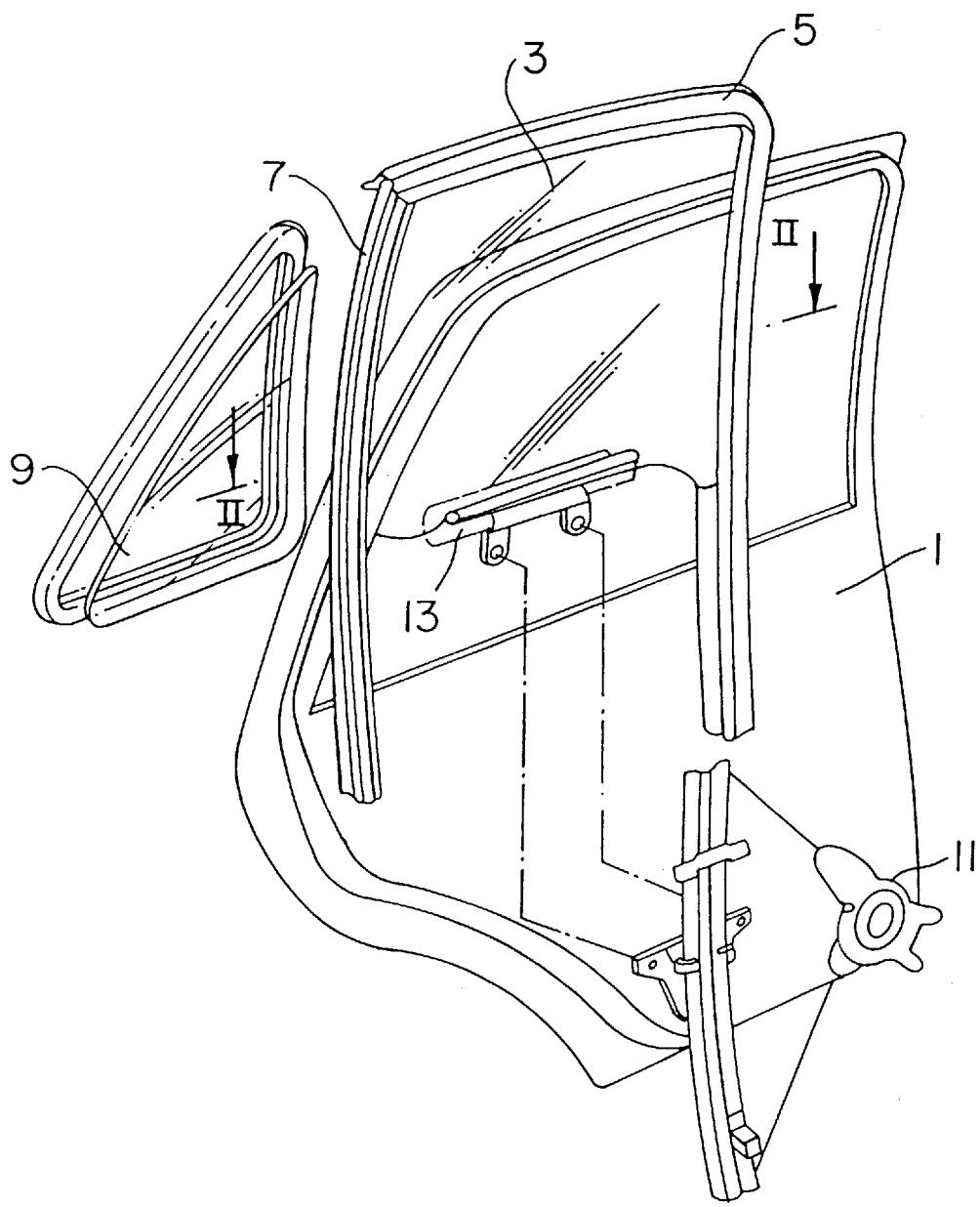
FIG. 1 is an exploded perspective view of a door employing a door glass lifting apparatus according to the present invention.

FIG. 1 is an exploded perspective view of a door employing a door glass lifting apparatus according to the present invention, and reference number 1 indicates a door frame 1.

A door glass run 5 lifting and guiding a door glass 3 and a division channel 7 removably coupled on the door glass run 5 are mounted on the door frame 1.

The division channel 7 is divided into the movable door glass 3 and fixed door glass 9, and the lower part of the lifted door glass 3 is fixed on a door glass grip 13 lifted by the operation of a door regulator 11 provided with the power from a power generating means. Further, the two sides of the door glass 3 are inserted into the door glass run 5 and the division channel 7 to be lifted.

Figure 2:
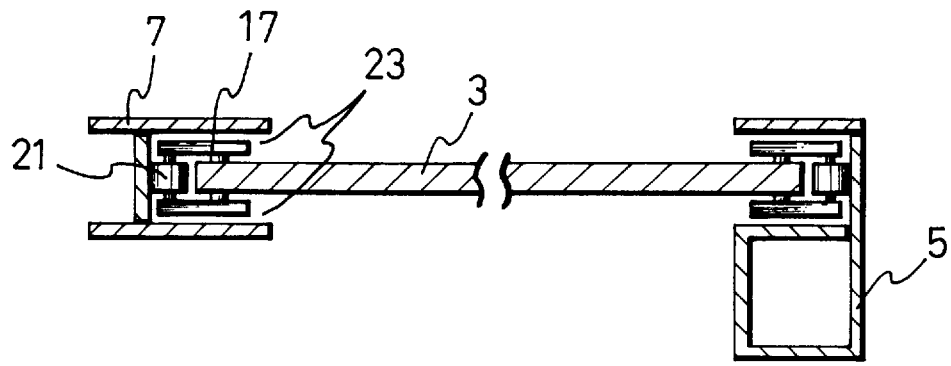
FIG. 2 is a sectional view as taken along a line 11—11 of FIG. 1.

The door glass 3 such like this, as shown FIG. 2, comprises friction reducing means on its two sides to be smoothly lifted by reducing the lifting friction when the force from the regulator 11 is applied to the door glass.

Figure 3:
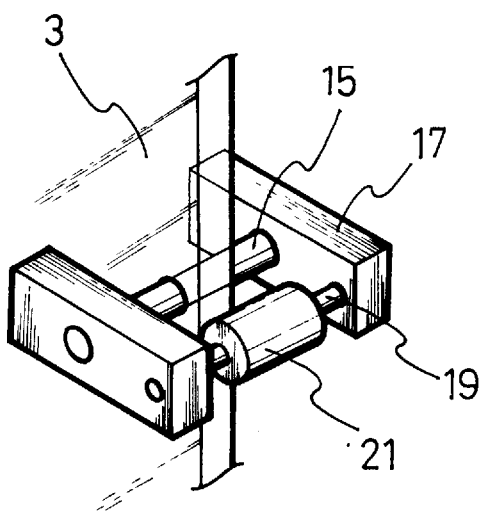
FIG. 3 is a perspective view of a door glass guide roller assembly according to the present invention.
Figure 4:
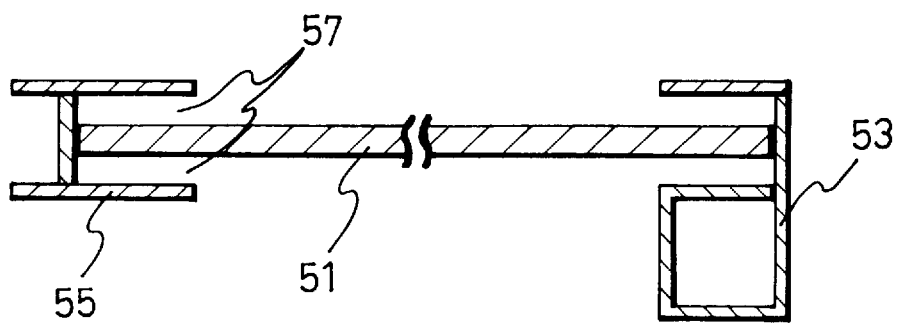
FIG. 4 is a sectional view as taken along a line A—A of FIG. 1, showing a mounting status of the door glass according to the conventional art.

The friction reducing means, as shown in FIG. 3, comprises a fixing axis 15, which can take the form of a pin, extending through a perforation in door glass 3, supporting members 17 mounted on the two ends of the fixing axis 15, a journal shaft 19 mounted on and disposed between the supporting members 17 adjacent to door glass 3, and rolling element 21 mounted on the journal shaft 19 adjacent to door glass 3 and extending beyond the supporting members 17 in a direction opposite to the edge of door glass 3.

The rolling member 21 is mounted between the supporting members 17 mounted on the door glass 3 and separates the side of the door glass 3 and the guide groove 23 by being inserted into groove 23 formed on the door glass run 5 and the division channel 7 to prevent the friction between the side of the door glass 3 and the guide groove 23, and the circumference thereof is contacted with one side of the guide groove 23.

It is desirable to provide the friction reducing means such like this in plural on upper and lower parts of the two sides of the door glass 3 in order that the door glass can be lifted in balance. FIG. 5 illustrates the plural arrangement of friction reducing means, showing the devices disposed on the upper and lower part of door glass 3.

According to the inventive door glass lifting means for vehicle, when the door regulator 11 lifts the door glass grip 13 mounted on the lower part of the door glass 3 with the power provided by the power generating means, the rolling members 21 of the friction reducing member mounted on the two sides of the door glass 3 are lifted with rolling along the guide grooves 23.

The lifting friction is remarkably reduced by such a rolling operation of the rolling member 21.

The reduction of the lifting friction extends the life of the door regulator 11 by reducing the load applied to the regulator and reduces the noise due to the friction.

As described, the door glass lifting apparatus for vehicle according to the present invention makes the door glass smoothly lifted and extends the life of the door regulator by reducing the friction between the door glass and the guide grooves formed on the door glass run and the division channel and guiding and supporting the door glass.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A door glass lifting means comprising:
   a door glass having a peripheral surface defined by a top, a bottom and two opposite side edges;
   guide grooves formed on a door glass run and a division channel for guiding and supporting said door glass lifted by force applied by a door regulator with power supplied from power generating means; and
   friction reducing means mounted on each of the opposite side edges of the door glass and disposed between each of the two opposite side edges of the door glass and the respective guide groove facing the opposite side edge, thereby reducing mutual lifting friction between the opposite side edges of the door glass and the guide grooves.

2. The door glass lifting means according to claim 1, wherein the friction reducing means is characterized by being provided in plural on the upper and lower parts of the two side edges of the door glass.

3. The door glass lifting means according to claim 1, wherein a plurality of identical friction reducing means are mounted on the door glass.

4. A door glass lifting means comprising:
   a door glass having two opposite side edges:
   guide grooves formed on a door glass run and a division channel for guiding and supporting said door glass lifted by force applied by a door regulator with power supplied from power generating means;
   friction reducing means mounted on the side edges of the door glass and inserted into said guide grooves to separate each of the two side edges of the door glass from the respective guide groove, thereby reducing mutual lifting friction between the side edges of the door glass and the guide grooves; and wherein said friction reducing means further comprises:
   fixing pins, each having two ends and extending through a hole in the door glass, mounted on two side edges of the door glass;
   supporting members respectively mounted on the ends of said fixing rolling members mounted on a journal shaft disposed between said supporting members and rolling along the guide grooves formed on the door glass run and the division channel.

* * * * *

UNITED STATES PATENT AND TRADEMARK OFFICE
CERTIFICATE OF CORRECTION

PATENT NO.: 5,802,769
DATED: September 8, 1998
INVENTOR: Kwangho LEE

It is certified that an error appears in the above-identified patent and that said Letters Patent is hereby corrected as shown below:

IN THE CLAIMS:

Claim 4, col. 4, line 29, "said fixing rolling members" should read --said fixing pins; and rolling members--.

Signed and Sealed this

First Day of December, 1998

*Attest:*

BRUCE LEHMAN

*Attesting Officer*                    Commissioner of Patents and Trademarks